US011921750B2

(12) United States Patent
Ho

(10) Patent No.: US 11,921,750 B2
(45) Date of Patent: Mar. 5, 2024

(54) DATABASE SYSTEMS AND APPLICATIONS FOR ASSIGNING RECORDS TO CHUNKS OF A PARTITION IN A NON-RELATIONAL DATABASE SYSTEM WITH AUTO-BALANCING

(71) Applicant: Salesforce.com, Inc., San Francisco, CA (US)

(72) Inventor: Shan-Cheng Ho, Sunnyvale, CA (US)

(73) Assignee: Salesforce, Inc.

( * ) Notice: Subject to any disclaimer, the term of this patent is extended or adjusted under 35 U.S.C. 154(b) by 215 days.

(21) Appl. No.: 16/173,057

(22) Filed: Oct. 29, 2018

(65) Prior Publication Data

US 2020/0134081 A1   Apr. 30, 2020

(51) Int. Cl.
G06F 16/27 (2019.01)
G06F 16/21 (2019.01)
G06F 16/22 (2019.01)
G06F 16/25 (2019.01)

(52) U.S. Cl.
CPC .......... *G06F 16/278* (2019.01); *G06F 16/211* (2019.01); *G06F 16/2272* (2019.01); *G06F 16/252* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

FOREIGN PATENT DOCUMENTS

WO   WO-2018094115 A1 *   5/2018   ............... C12N 9/22

*Primary Examiner* — Kris E Mackes
*Assistant Examiner* — Cao D Vuong
(74) *Attorney, Agent, or Firm* — Lorenz & Kopf, LLP

(57) ABSTRACT

A method and system are provided for assigning a particular record into a chunk of a partition within a non-relational database system. When a number of records in a particular candidate chunk is greater than a particular threshold number, an application performs an auto-balancing operation to split the particular candidate chunk such that records originally assigned to the particular candidate chunk are divided among the particular candidate chunk and a new chunk. Some of the number of records that were originally part of the particular candidate chunk are assigned to a new chunk and the other remaining ones of the number of records that were originally part of the particular candidate chunk remain assigned to the particular candidate chunk.

17 Claims, 10 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Jakobson |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0162462 A1* | 7/2007 | Zhang ............... G06F 16/10 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2011/0307659 A1* | 12/2011 | Hans ............... G06F 3/0613 |
| | | 711/114 |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0041777 A1* | 2/2016 | Tripathy ............... G06F 16/172 |
| | | 711/126 |
| 2018/0246934 A1* | 8/2018 | Arye ............... G06F 16/2264 |
| 2018/0293138 A1* | 10/2018 | Defiebre ............... G06F 16/22 |
| 2018/0300385 A1* | 10/2018 | Merriman ............ G06F 16/278 |
| 2019/0042465 A1* | 2/2019 | Li ............... G06F 12/0246 |

\* cited by examiner

FIG. 3A

| a01 | a02 | a03 | b01 | b02 | b03 | c01 | c02 | c03 | d01 | d02 | e01 | f01 | f02 | f03 |

FIG. 3B

| a01 | a02 | a03 | b01 | b02 | b03 | c01 | c02 | c03 | d01 | d02 | d03 | e01 | f01 | g01 |
| 1000 a01 | 1000 b02 | 1000 c03 | 1000 e01 | 3000 a02 | 3000 b01 | 3000 c01 | 3000 c02 | 3000 d01 | 6500 b03 | 6500 a03 | 6500 d03 | 9900 d02 | 9900 g01 | 10020 f01 |

FIG. 3C

| 2016-01-05 14:00 | 2016-03-15 20:33 | 2016-07-11 12:00 | 2016-11-08 04:30 | 2016-12-31 23:00 | 2017-01-03 15:00 | 2017-02-19 17:00 | 2017-05-01 04:00 | 2017-09-01 14:20 | 2018-02-28 03:00 | 2018-03-01 22:00 | 2018-06-09 05:00 | 2018-08-15 11:00 | 2018-11-16 20:00 | 2019-01-11 14:00 |
| 2016-01-01 00:00 a01 | 2016-01-01 00:00 b02 | 2016-01-01 00:00 c03 | 2016-01-01 00:00 e01 | 2016-01-01 00:00 a02 | 2016-01-01 00:00 b01 | 2016-01-01 00:00 c01 | 2016-01-01 00:00 c02 | 2016-01-01 00:00 d01 | 2018-01-01 00:00 b03 | 2018-01-01 00:00 a03 | 2018-01-01 00:00 d03 | 2018-01-01 00:00 d02 | 2018-01-01 00:00 g01 | 2019-01-01 00:00 f01 |
| 2016-01-05 14:00 | 2016-03-15 20:33 | 2016-07-11 12:00 | 2016-11-08 04:30 | 2016-12-31 23:00 | 2017-01-03 15:00 | 2017-02-19 17:00 | 2017-05-01 04:00 | 2017-09-01 14:20 | 2018-02-28 03:00 | 2018-03-01 22:00 | 2018-06-09 05:00 | 2018-08-15 11:00 | 2018-11-16 20:00 | 2019-01-11 14:00 |

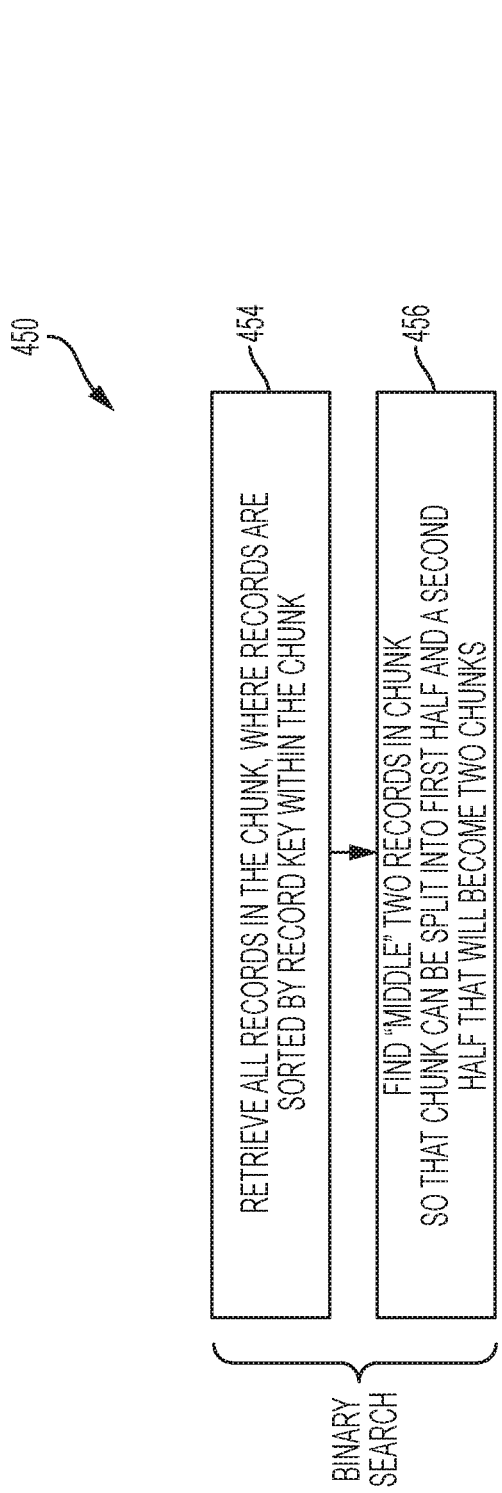

– 1 –

DATABASE SYSTEMS AND APPLICATIONS FOR ASSIGNING RECORDS TO CHUNKS OF A PARTITION IN A NON-RELATIONAL DATABASE SYSTEM WITH AUTO-BALANCING

TECHNICAL FIELD

Embodiments of the subject matter described herein relate generally to database system. More particularly, embodiments of the subject matter relate to database systems and applications for assigning records to chunks of a partition in a non-relational database system with auto-balancing.

BACKGROUND

Many day-to-day data management tasks need to iterate through a collection of data with a particular order required by application logic. Traditional relational databases often provide iteration capability by applying a B-tree or similar algorithm to data file storage and sometimes in memory layout. A B-tree is a self-balancing tree data structure that maintains sorted data and allows searches, sequential access, insertions, and deletions in logarithmic time. The B-tree is a generalization of a binary search tree in that a node can have more than two children. Unlike self-balancing binary search trees, the B-tree is well suited for storage systems (e.g., databases and file systems) that read and write relatively large blocks of data.

However, when data are stored in big-data storage system (e.g., NoSQL database system), as opposed to a traditional relational database, iterating through the whole set of data in a partition can be problematic. Iterating through the whole partition is slow since it requires the iteration process to fetch each individual records, or at least fetch a fixed-size batch and use the last record as the next starting point. Iterating through the whole partition is wastes computation resources because the application needs to hold onto connection to database and create records in memory for counting and dispatching. Iterating through the whole partition also tends to handicap the use of parallel processing. Because of the need to iterate, it is hard to optimize with parallel processing in advance. Iterating through the whole set of data requires the pagination process to be light and fast, while not incurring heavy memory consumption at the storage server. As big-data storage solutions use different types of storage formats, such as log-structure merge tree, or levelDB, to optimize other aspects of big-data concerns, the capability of quick pagination from arbitrary offset is less of a priority.

Big-data storage solutions (e.g., distributed, wide column stores, such as Apache Cassandra) may provide an alternative to use a secondary key, such as clustering key, instead of numerical offset as an anchor point for pagination. However, this kind of offset is not intuitive and does not provide applications a sense regarding how far deep the pagination process has been or enable parallelizing iteration. On the other hand, equal sizing of each page is not a hard requirement for those data management tasks in question. As long as all the pages contain similar amount of data (e.g., within 20-30% of one another), the tasks can be dispatched and executed in parallel, and finish in a similar timely fashion.

It would be desirable to provide improved techniques that do not require iterating through the whole set of data in a partition.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3A is a block diagram that conceptually illustrates data records that are stored within one storage partition in sorted by record key.

FIG. 3B illustrates one non-limiting example where record keys are strings that are mapped to a corresponding chunk key that is a hash code in this non-limiting example.

FIG. 3C is another non-limiting example where record keys are expressed as a date-time that is mapped to a chunk key that is a time-stamp in this non-limiting example.

FIG. 6 is a method for determining a split point for splitting a chunk of a partition within a database in accordance with one non-limiting implementation of the disclosed embodiments.

FIG. 7 is a diagram of records in a partition before and after applying an auto-balancing process in accordance with the disclosed embodiments.

DETAILED DESCRIPTION

Figure 1:
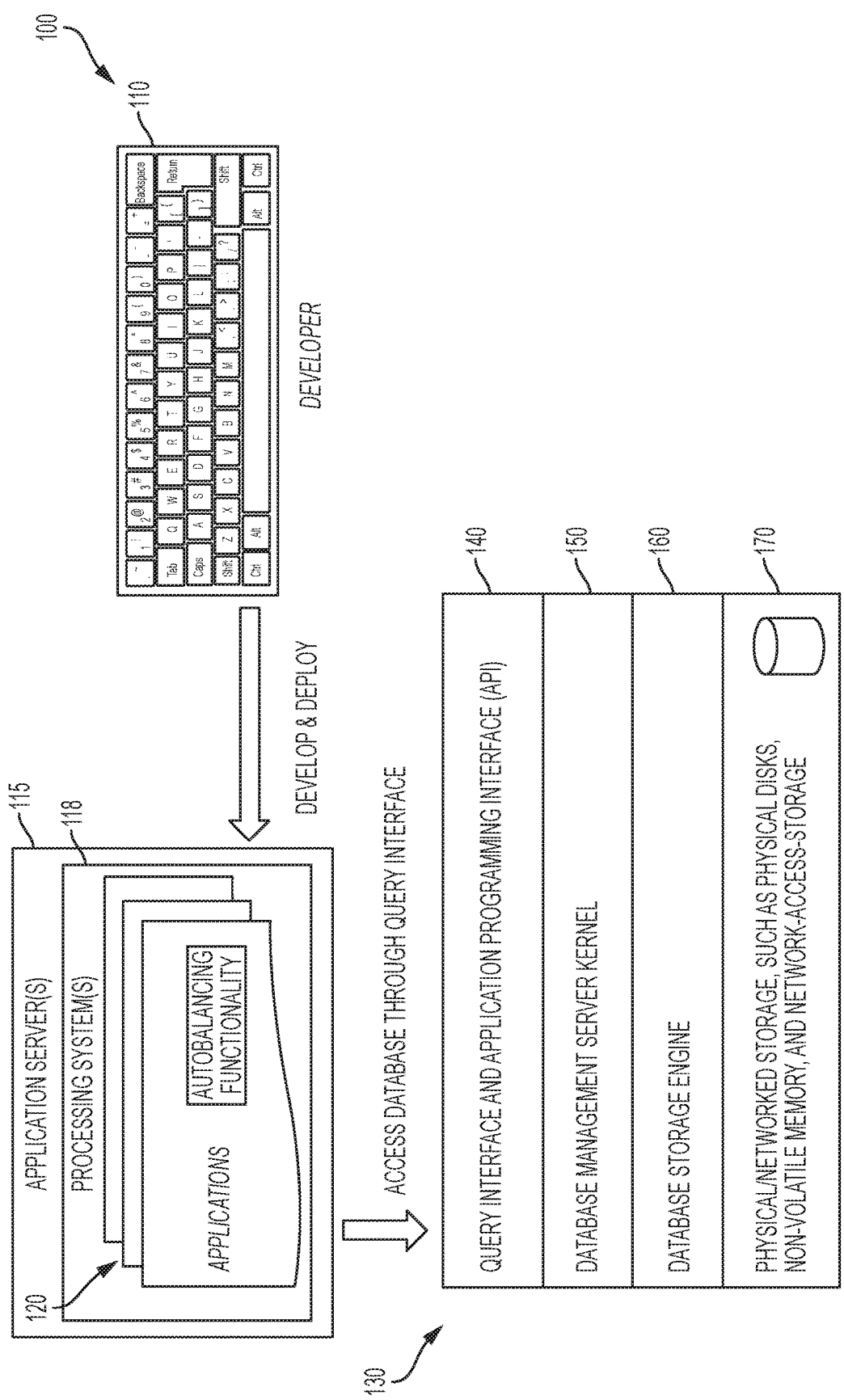
FIG. 1 is a system in accordance with the disclosed embodiments.

A method and system are provided for assigning a particular record into a chunk of a partition within hardware-based network storage of a non-relational database system. As will be described in greater detail below, the non-relational database system is capable of supporting chunking of the records in the partition so that auto-balancing functionality can be implemented at a query level within an application. The application is written to follow a particular database schema supported by a database management system (DBMS) that allows auto-balancing functionality to be provided. Information needed to store a record in accordance with the particular database schema comprises: (1) a partition key, (2) a chunk key, (3) a record key, and (4) data associated with the particular record.

The non-relational database system includes hardware-based network storage that comprises a plurality of partitions, and DBMS having a query interface and application programming interface for the application, and a database storage engine used to create, read, update and delete (CRUD) records at the hardware-based network storage. Each partition comprises one or more chunks, where each chunk stores a number of records within a particular partition. The partition is a collection of records that have a common attribute for grouping and within that partition.

An application server includes a hardware-based processing system configured to execute the application as a server process to generate a particular record having a corresponding record key that is to be inserted into the non-relational database system. The application is configured to: access the non-relational database system through the query interface and application programming interface for the application when the particular record is ready to be inserted into the partition. The application can determine, at a mapping function of a mapping module of the application based on the particular record, a natural chunk key; and assign the particular record, at a chunk assignment module of the application, to a particular candidate chunk that is a closest chunk available for insertion of the particular record at a particular time that satisfies the assignment formula.

For example, in one embodiment, when the natural chunk key is greater than or equal to the chunk key of a chunk at index k and less than a chunk key of the chunk at index k+1, the mapping function maps the record key to a particular chunk key. The particular chunk key is a unique identifier that identifies the particular candidate chunk in the partition and allows groups of records to be queried more efficiently within the database and rendered in a page. The record key is an identifier that uniquely identifies the particular record and maps to the particular chunk key. To explain further, each record is the system has a corresponding record key having a value, and a chunk key that maps the value of the record key to a corresponding chunk to satisfy an assignment formula: $chunk\_key(k) \leq f(\text{record key}) < chunk\_key(k+1)$, where k and k+1 are indices of two consecutive chunks that are available at the time of insertion and chunk keys are in sorted order.

The application can insert the particular record into the particular candidate chunk, and then determine whether a number of records in the particular candidate chunk exceeds a particular threshold number. The particular record remains inserted into the particular candidate chunk when the number of records in the particular candidate chunk is less than or equal to the particular threshold number. In accordance with the disclosed embodiments, when the number of records in the particular candidate chunk is greater than the particular threshold number, the application can then perform an auto-balancing operation at a chunk splitting module. As a result of the auto-balancing operation the particular candidate chunk is split such that records originally assigned to the particular candidate chunk are divided among the particular candidate chunk and a new chunk after the auto-balancing operation is complete. As such, some of the number of records that were originally part of the particular candidate chunk are assigned to the new chunk and other remaining ones of the number of records that were originally part of the particular candidate chunk remain assigned to the particular candidate chunk.

In one embodiment, the application performs the auto-balancing operation by executing computer-executable instructions that are capable of causing the application to: compute, at the mapping module via a mapping function based on the record key, the natural chunk key using the record key of the particular record, wherein the natural chunk key corresponds to the particular record to be inserted; and determine whether the natural chunk key equals the particular chunk key. When it is determined that the natural chunk key equals the particular chunk key, the application can perform a binary search by record key within the particular candidate chunk to find a new record to serve as the split point for splitting the particular candidate chunk into the particular candidate chunk and the new chunk, and compute, at the mapping module via the mapping function (using a new record key of the new record), a new chunk key that satisfies the assignment formula. The application can then determine whether the natural chunk key equals the particular chunk key, and when it is determined that the natural chunk key is greater than the particular chunk key, the particular record is the split point for a new chunk to-be created having a new chunk key that is equal to the natural chunk key. The application can then split the particular candidate chunk into the particular candidate chunk and the new chunk.

In one embodiment, the application performs the binary search by record key within the particular candidate chunk by executing computer-executable instructions that are capable of causing the application to: retrieve all records in the particular candidate chunk having the natural chunk key; sort all the records by record key; and determine records in the particular candidate chunk where the particular candidate chunk is to be split into a first half and a second half. For instance, when the size (nk) of the chunk is even, the application can determine that a middle two records where the particular candidate chunk is to be split into the first half and the second half are a first record n and a second record n+1. By contrast, when the size (2n+1) of the chunk is odd, the application can determine that the records, where the particular candidate chunk is to be split into the first half and the second half, are a middle record n+1 and a record n+1 before the middle record.

The disclosed embodiments can allow millions of records in a partition to be split and grouped into a fixed number of chunks without iterating through the whole partition. The range of the "fixed number of chunks" can be, for example, in hundreds or thousands, which is a few orders of magnitude smaller than the size of the partition. For example, a partition of one million or so records can be split into one thousand chunks, each with on average one thousand records, or into two hundred chunks, with roughly five thousand records in each chunk. Once the partition is split into those chunks, records in one chunk can be processed in another application as a unit. The splitting process does not need to iterate the partition. It needs only to hand out the chunk keys and start processing in parallel.

FIG. 1 is a system 100 in accordance with the disclosed embodiments. The system 100 includes a development environment 110, application servers 115, and a database system 130. In the development environment 110, a developer can develop applications 120 that are eventually deployed to application servers 115. The applications 120 are designed to provide auto-balancing functionality that will be described below.

The application servers 115 and database system 130 are a deployment and execution environment 120, 130, where the applications 120 are executed at processing system(s) 118 of application server(s) 115 to access the database system 130 through a query interface of the database system 130. In other words, the application server(s) 115 include computer hardware processing system(s) 118 that execute the applications 120 as a server process having built in auto-balancing functionality.

The database system 130 includes different layers including a query interface and application programming interface 140, a database management server kernel 150, a database storage engine 160, and physical network storage 170, such as physical disks, non-volatile memory, and network access storage. The query interface and application programming interface 140, the database management server kernel 150, and the database storage engine 160 are software components of a database management system (DBMS). The query interface and application programming interface 140 is the interface to the DBMS for applications 120. The database storage engine 160 is an underlying software component of the database management system (DBMS) used to create, read, update and delete (CRUD) records from the physical network storage 170 portion of the database system 120. The physical network storage 170 is a hardware layer that runs the DBMS, and includes CPU and memory (not illustrated for sake of simplicity).

In accordance with the disclosed embodiments, the database system 130 is a non-relational or "NoSQL-type" database system. The database system 130 stores records in partitions. Each partition can include a number of chunks, where each chunk of a particular partition stores a limited number of records (sorted by their corresponding record keys) within that particular partition. The database system 130 is capable of supporting chunking of data records inside a partition so that auto-balancing functionality can be implemented at the query level within the application(s) 120. As used herein, the term "partition" can refer to a large collection of data records that have a common attribute for grouping. For example, all user records have an organization ID, and the user records that belong to an organization can be stored in the same partition. Within a particular partition, records can be stored in groups that are referred to as chunks herein. As used herein, the term "chunk" can refer to a unit to store a limited number of data records in a partition. A partition may have from zero to many chunks.

When the applications 120 that include the disclosed auto-balancing functionality are developed and deployed, this auto-balancing functionality of the applications 120 can allow the application to access a database system 130 through a query interface 140. When a record is to be created and inserted into the database system 130, the record will be inserted into a particular chunk within a particular partition. In some cases, the number of records stored in a particular chunk can exceed a threshold number. As will be describe in greater detail below, the auto-balancing functionality allows for a particular chunk to be split into two chunks so that the individual chunks do not become too crowded and have sufficient headroom. As used herein, the term "chunk split" can refer to the process of breaking a chunk into two (or more) chunks when the size of a chunk grows beyond a designated threshold to regain headroom for future growth. This is the main mechanism for chunk auto-balancing As used herein, a non-relational or NoSQL-type database system refers to a database system that provides a mechanism for storage and retrieval of data that is modeled in means other than the tabular relations used in relational databases. NoSQL databases are increasingly used in big data and real-time web applications. NoSQL-type database systems are also sometimes called "Not only SQL" to emphasize that they may support SQL-like query languages, or sit alongside SQL database in a polyglot persistence architecture. NoSQL-type database systems allow for simpler "horizontal" scaling to clusters of machines (which is a problem for relational databases), and finer control over availability. The data structures used by NoSQL-type database systems (e.g. key-value, wide column, graph, or document) are different from those used by default in relational databases, making some operations faster in NoSQL. The particular suitability of a given NoSQL database depends on the problem it must solve. Sometimes the data structures used by NoSQL databases are also viewed as "more flexible" than relational database tables.

There are many known types or classifications of non-relational database systems, each with different categories and subcategories, some of which overlap. Some non-limiting examples classified by data model include: column-type non-relational database systems (e.g., Accumulo, Cassandra, Druid, HBase, Vertica); document-type non-relational database systems (e.g., Apache CouchDB, ArangoDB, BaseX, Clusterpoint, Couchbase, Cosmos DB, IBM Domino, MarkLogic, MongoDB, OrientDB, Qizx, RethinkDB); key-value type non-relational database systems (Aerospike, Apache Ignite, ArangoDB, Berkeley DB, Couchbase, Dynamo, FairCom c-treeACE, FoundationDB, InfinityDB, MemcacheDB, MUMPS, Oracle NoSQL Database, OrientDB, Redis, Riak, SciDB, SDBM/Flat File dbm, ZooKeeper); and graph-type non-relational database systems (AllegroGraph, ArangoDB, InfiniteGraph, Apache Giraph, MarkLogic, Neo4J, OrientDB, Virtuoso).

Key-value type non-relational database systems (also referred to as Key-value (KV) stores) use an associative array (also known as a map or dictionary) as their fundamental data model. In this model, data is represented as a collection of key-value pairs, such that each possible key appears at most once in the collection. The key-value model is one of the simplest non-trivial data models, and richer data models are often implemented as an extension of it. The key-value model can be extended to a discretely ordered model that maintains keys in lexicographic order. This extension is computationally powerful, in that it can efficiently retrieve selective key ranges. Key-value stores can use consistency models ranging from eventual consistency to serializability. Some databases support ordering of keys. There are various hardware implementations, and some users maintain data in memory (RAM), while others employ solid-state drives (SSD) or rotating disks (aka Hard Disk Drive (HDD)).

Document-type non-relational database systems (also referred to as document stores) assume that documents encapsulate and encode data (or information) in some standard formats or encodings. Encodings in use include XML, YAML, and JSON as well as binary forms like BSON. Documents are addressed in the database via a unique key that represents that document. One of the other defining characteristics of a document-oriented database is that in addition to the key lookup performed by a key-value store, the database also offers an API or query language that retrieves documents based on their contents. Different implementations offer different ways of organizing and/or grouping documents: collections, tags, non-visible metadata, directory hierarchies, etc. Compared to relational databases, for example, collections could be considered analogous to tables and documents analogous to records. But they are different: every record in a table has the same sequence of fields, while documents in a collection may have fields that are completely different.

Graph-type non-relational database systems are designed for data whose relations are well represented as a graph consisting of elements interconnected with a finite number of relations between them. The type of data could be social relations, public transport links, road maps, network topologies, etc.

A sub-category or classification of non-relational database systems include wide column store type non-relational database systems, such as, Amazon DynamoDB, Bigtable, Cassandra, Druid, HBase, Hypertable, etc. For instance, Cassandra is wide column store, and, as such, essentially a hybrid between a key-value and a tabular database management system. Its data model is a partitioned row store with tunable consistency. Rows are organized into tables; the first component of a table's primary key is the partition key; within a partition, rows are clustered by the remaining columns of the key. Other columns may be indexed separately from the primary key. A column family resembles a table in an RDBMS. Column families contain rows and columns. Each row is uniquely identified by a row key. Each row has multiple columns, each of which has a name, value, and a timestamp. Unlike a table in an RDBMS, different rows in the same column family do not have to share the same set of columns, and a column may be added to one or multiple rows at any time. Each key in Cassandra corresponds to a value which is an object. Each key has values as columns, and columns are grouped together into sets called column families. Thus, each key identifies a row of a variable number of elements. These column families could be considered then as tables. A table in Cassandra is a distributed multi-dimensional map indexed by a key. Furthermore, applications can specify the sort order of columns within a Super Column or Simple Column family.

In accordance with the disclosed embodiments, an auto-balancing feature is disclosed that provides an auto-balance pagination behavior that leverages schema definition. The auto-balance mechanism is examined and applied at a query level, instead of depending on data layout in storage or in memory. This is generic enough for applications to adopt while is different from other approaches that are targeted for a database storage file format or used for in-memory or on-disk data structure.

While data may have its natural record key, such as names, IDs, creation date-time, all data types for key definition can have a mapping function to map from original value to a numerical value. For example, as will be described below with reference to FIG. 3B, with a fixed algorithm, a string can hash into an integer, with a value range from 0 to 2 billion. As another example, as will be described below with reference to FIG. 3C, a date-time field can convert to a timestamp of Unix epoch time, which is a 64-bit integer. Each record can then be assigned by its numerical mapping of its record key to an existing chunk such that:

chunk_key($k$)≤$f$(record key)<chunk_key($k$+1), where k and k+1 are indices of two consecutive chunks and chunk keys are in sorted order.

Database Schema and Data Lifecycle Operations

To implement the auto-balancing functionality described above, when writing applications, the developer 110 must follow a particular database schema supported by the database management system (DBMS), which will be described in greater detail below. A database schema of a database system is its structure described in a formal language supported by the database management system (DBMS). The term "schema" can refer to the organization of data as a blueprint of how the database is constructed. A database generally stores its schema in a data dictionary, schema is the structure of the database that defines the objects in the database. One formal definition of a database schema is a set of formulas (sentences) called integrity constraints imposed on a database. Thus, a schema can contain formulas representing integrity constraints specifically for an application and the constraints specifically for a type of database, all expressed in the same database language. These integrity constraints ensure compatibility between parts of the schema. All constraints are expressible in the same language. A database can be considered a structure in realization of the database language. The states of a created conceptual schema are transformed into an explicit mapping, the database schema. This describes how real-world entities are modeled in the database.

Conventional Database Table Creation Declaration

The following database table creation declaration demonstrates a conventional or typical schema definition without auto-balance features.

```
CREATE TABLE test {
partition_key, - the partition key, such as org name
record_key
record_data
} (PARTITION BY partition_key, CLUSTER BY chunk, ORDER BY
chunk ASC)
```

This table definition specifies that the minimum information needed to store a record is: (1) a partition key, (2) a record key and (3) data associated with the record.

Auto-Balanced Database Table Creation Declaration

In accordance with the disclosed embodiments, the following database table creation declaration demonstrates a table definition that can be used to implement auto-balance features.

```
CREATE test {
partition key, - the partition key, such as org name
chunk, - the chunk designation or chunk key
record_key
record_data
} (PARTITION BY partition_key, CLUSTER BY chunk, ORDER BY
chunk ASC)
```

This table definition specifies that the minimum information needed to store a record in accordance with the particular database schema is: (1) a partition key, (2) a chunk key (name "chunk" in the declaration), (3) a record key, and (4) data associated with the record.

In computer programming, four basic functions or data lifecycle operations for persistent storage are commonly referred to using the acronym CRUD, which stands for Create, Read, Update and Delete (CRUD). To implement auto-balancing these basic functions can be implemented as follows:

Create Operation (C)

The following two queries demonstrate the steps in an application to insert a record in a chunk. The first query decides which chunk this record should be inserted into. The second query inserts the record to the chunk with a chunk key "chunk_id" decided in the first step. The value "a record_key" is the variable name for the record key of the record to be inserted.

Decide Chunk Designation

```
SELECT chunk as chunk_id FROM test WHERE chunk <=
   mapping(a_record_key)
   ORDER BY chunk DESC limit 1
```

Write to Table

INSERT INTO test partition, chunk, key VALUES (pk, chunk_id, a_key)

Fetch Operation (R)

A goal of this algorithm is to support quick approximate pagination for iteration through a large amount of data in a partition. To perform this task using queries, an application needs to be able to iterate through the following steps: (1) start with the first chunk as the current chunk; (2) get the chunk key of the current chunk; (3) get all records in the current chunk; (4) move to the next chunk, and set as the current chunk; (5) get all the records in this chunk; and (6) repeat the steps from 2 to 5 until there are no more chunks to retrieve. So, to perform this iteration, three types of queries need to be supported: (1) get the chunk key of a chunk to start the iteration; (2) read all records in a chunk given a chunk key; and (3) find the chunk key of the next chunk from the previously accessed chunk.

Get all Records in a Chunk Given Chunk k—Chunked Fetch for Iteration

SELECT * FROM TEST WHERE partition=pk AND chunk=ID_of_chunk(k)

Find the First Chunk

SELECT chunk FROM test ORDER BY chunk ASC LIMIT 1;

Find the Next Chunk from Chunk k

SELECT chunk FROM test WHERE chunk>k ORDER BY chunk ASC LIMIT 1

Get the Size of a Chunk Given Chunk k

When a chunk needs splitting, it is possible that the last inserted record is close to the front of the chunk by its natural sorting order. If a new chunk key is computed using this new record, the computation may result in a value identical to the chunk key, in which case the location of the last inserted chunk is not suitable for splitting. To find a better location to split the chunk, it is important to know the size of the chunk in order to find a midpoint. The following query demonstrates how to find the size of the chunk.

---

SELECT COUNT(*) FROM test WHERE partition = pk AND chunk = ID_of_chunk(k)

---

Read Operation (R)

For a read operation, the chunk designation for a given record key is decided, and the record is read using the partition key, chunk, and record key.

Update Operation (U) and Delete Operation (D)

These both follow the Same steps as the creation operation: decide the chunk designation and then write to the table.

Auto-Balance Operation

Figure 2:
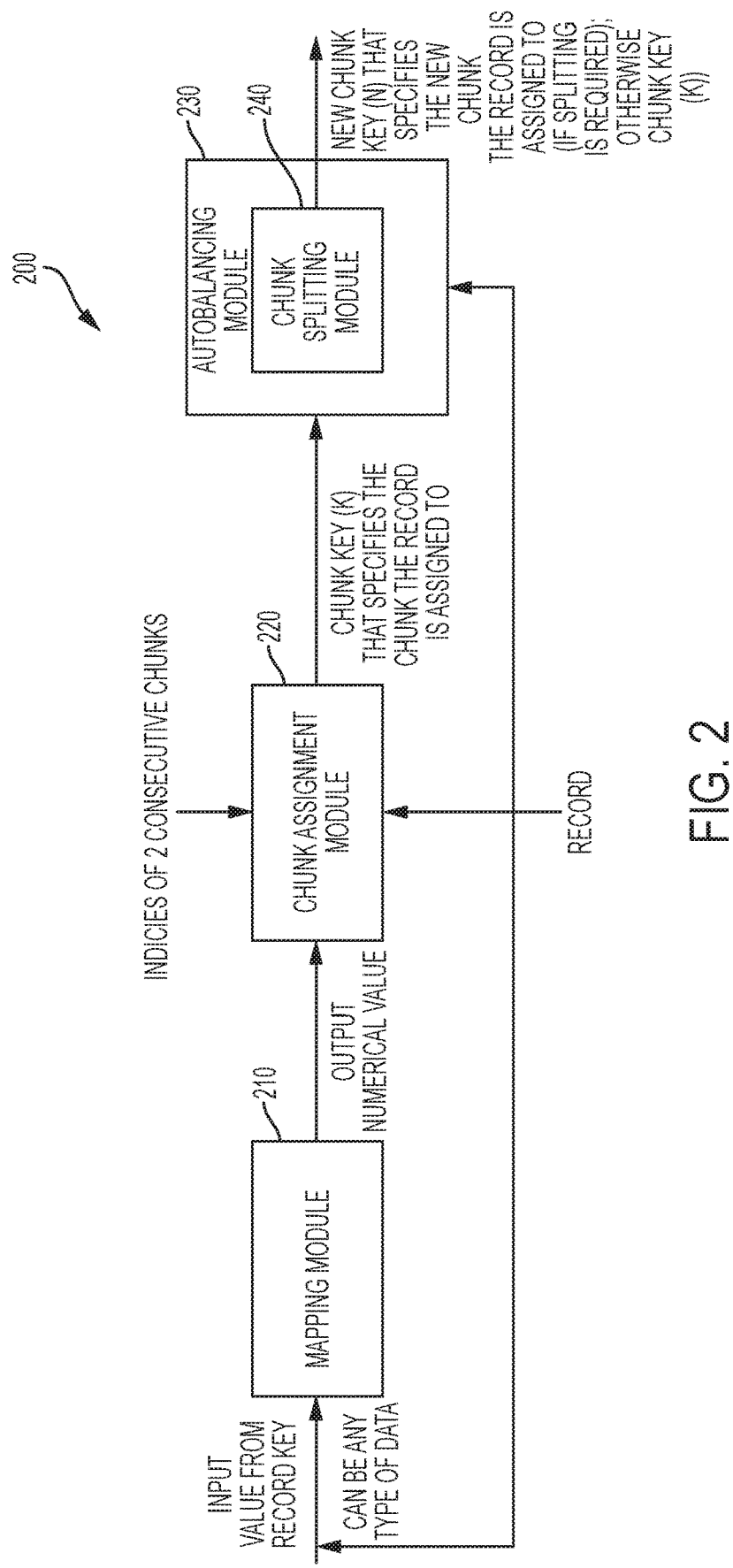
FIG. 2 is a record assignment module in accordance with the disclosed embodiments.

FIG. 2 is a record assignment module 200 and accordance with the disclosed embodiments. The record assignment module 200 includes a mapping module 210, a chunk assignment module 220, and an auto-balancing module 230. FIG. 2 will be described with continued reference to FIG. 1 and with reference to FIGS. 3A-3B.

As noted above, records are stored within a particular partition of the database system 130 of FIG. 1. An example is shown in FIG. 3A, which is a block diagram that conceptually illustrates fifteen data records (a01 ... f03) that are stored within one storage partition in sorted by record key. As used herein, the term "record key" (also referred to as a primary key or record ID) can refer to an identifier that uniquely identifies a record in a given data storage system. For example, social security ID to identify a person. For large data sets, the record keys for records in a partition can be mapped to one or more chunk keys. In some cases, a partition can have more than one chunk (e.g., where the chunks are a further division of a partition). As used herein, the term "chunk key" can refer to a unique identifier to identify a chunk in a partition. A chunk key can be shared (in common) by multiple records. A chunk key allows groups of records to be grouped into a chunk so that large databases can be queried more efficiently.

The mapping module 210 receives an input value from a record key of a record. This input value can be any type of data so in some cases it is necessary to convert that input value to a numerical value. In such cases, the mapping module 210 converts or maps the input value from the record key to an output that is a numerical value. The mapping module 210 takes an input value (i.e., data from a record) and deterministically outputs a corresponding output value that can be used or interpreted for other purposes. For example, the mapping module could map postal code from a record to a corresponding county and a corresponding state.

The chunk assignment module 220 receives this output from the mapping module 210, and also receives the record and indices of two consecutive chunks. Based on those inputs, the chunk assignment module 220 computes chunk key that specifies a corresponding chunk that the record is to be assigned to. For example, in one embodiment, the chunk assignment module 220 takes a record, computes the chunk key using the output value output by the mapping function, and then stores the record to the chunk identified by the chunk key. The stored record includes the input value, the output value, the chunk key and the record key. The records in a given chunk are arranged/ordered so that they can be rendered in a page or fixed-sized group. In this regard, the process of pagination can refer to the process of arranging a collection of data into an ordered list and rendering them in fixed-sized groups, whereas the process of "deep pagination" can refer to a pagination process that does not stop at the beginning of a large amount of data, but goes "deeply" into the data set. At the same time, the pagination process forces the storage server to hold the client session for a long time or forces the storage to reconstruct data view for each page. For example, if the use case is to iterate through all records in a particular table/column family, it would require going through all partitions. The steps of getting data batch by batch is pagination. "Deep pagination" refers to fetching the portion at the later part of the process, which goes "deep" into data storage.

For example, FIG. 3B illustrates one non-limiting example where record keys of the records that are stored in a partition of FIG. 3A, are strings that are mapped to a corresponding chunk key, which is a hash code in this example. To explain further, in the example illustrated in FIG. 3B, record keys a01, b02, c03 and e01 are mapped to chunk key 1000, record keys a02, b01, c01, c02 and d01 are mapped to chunk key 3000, record keys b03, a03, d03 are mapped to chunk key 6500, record keys d01 and g01 are mapped to chunk key 9900, and record f01 is mapped to chunk key 10020. As another non-limiting example, FIG. 3C illustrates record keys that are expressed as a date-time (i.e., an established numerical representation) that can be mapped to a chunk key that is a time-stamp. In the example illustrated in FIG. 3C, five record keys are mapped to chunk key 2016-1-0100:00, four record keys are mapped to chunk key 2017-1-0100:00, five record keys are mapped to 2018-1-0100:00, and one record key is mapped to chunk key 2019-1-0100:00.

In some cases, the chunk, that corresponds to a chunk key generated by the chunk assignment module 220, has adequate room within the chunk to allow the record to be assigned to the chunk (i.e., corresponding to the chunk key generated by the chunk assignment module 220). However, in other cases, the chunk, that corresponds to this chunk key, includes too many records, for example, when the number of records stored in the chunk are above a threshold value or number. In such cases, it is necessary to split the chunk (that corresponds that chunk key) into two different chunks so that there is room for the record to be assigned to an appropriate chunk that has enough room. Splitting can be triggered, for example, whenever anew record is inserted, or possibly when an existing record is updated. In this regard, splitting can refer to a process that keeps chunks from growing too large so that when a chunk grows beyond a specified chunk size, the chunk is split into two (or more) chunks that each have different chunk key value that represents that particular chunk. So multiple records within a particular chunk can share a particular chunk key.

To do so, the auto-balancing module 230 includes a chunk splitting module 240. The chunk splitting module 240 processes the chunk key from the chunk assignment module 220, and if necessary, splits the corresponding chunk into two (or more) chunks so that the record can be assigned to an appropriate chunk that has enough room. Further details of the operation will be described below with reference is to FIGS. 4 through 9.

Figure 4:
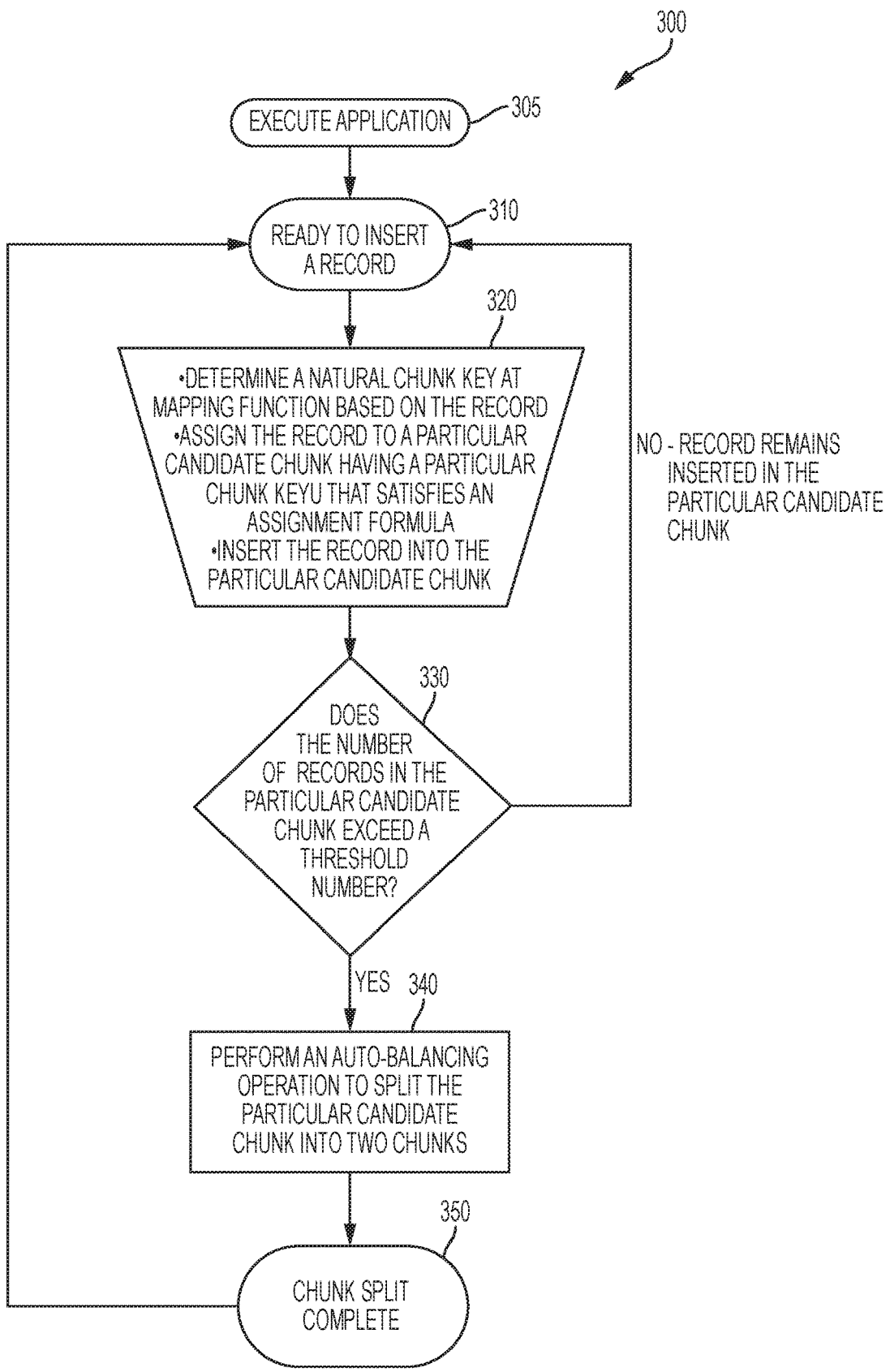
FIG. 4 is a method for assigning a record to a chunk of a partition within a database in accordance with the disclosed embodiments.
Figure 5:
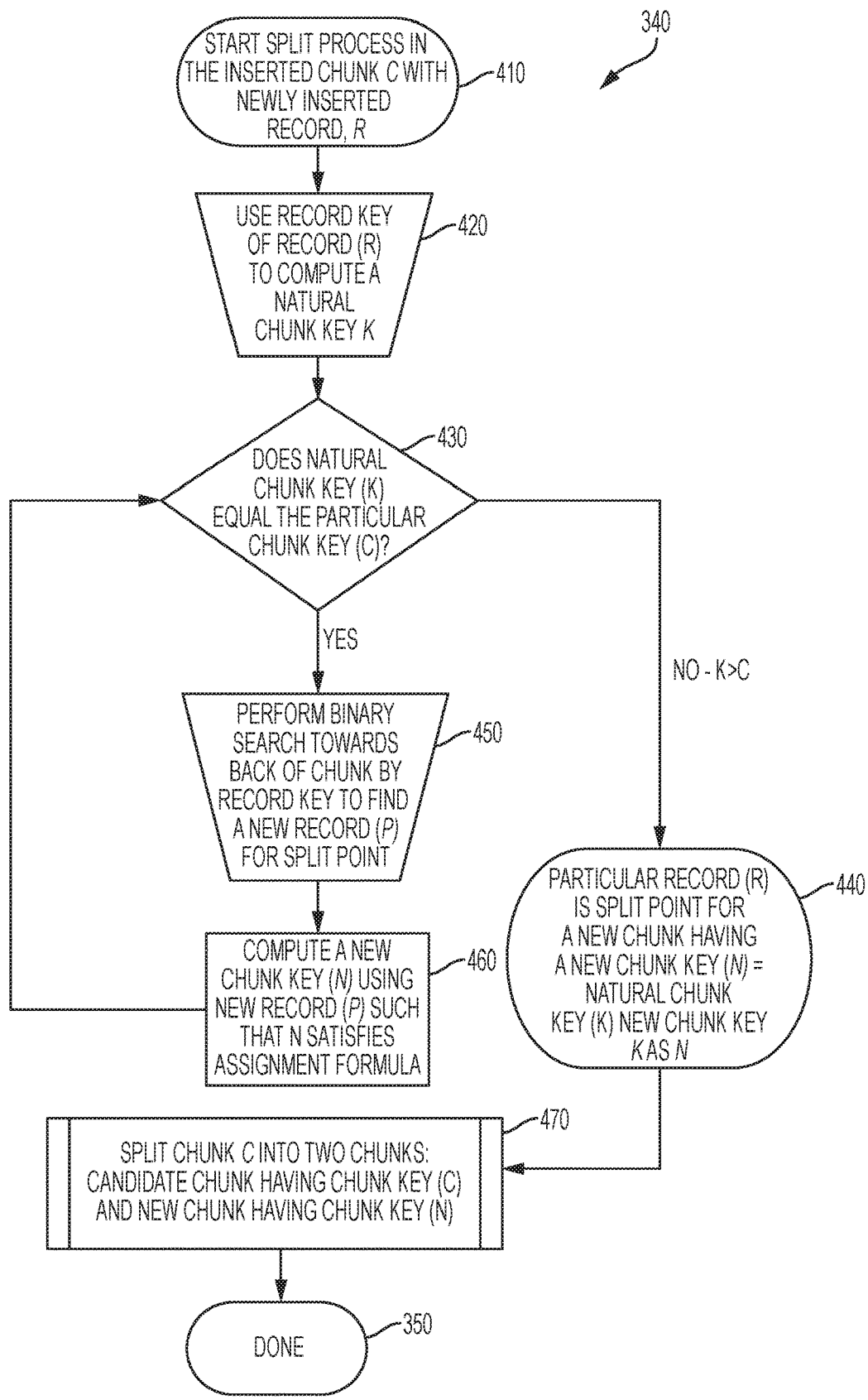
FIG. 5 is a method for assigning a record to a chunk of a partition within a database and splitting the chunk when splitting is warranted in accordance with the disclosed embodiments.

FIGS. 4-6 are flow charts that illustrates examples of auto-balancing methods in accordance with the disclosed embodiments. With respect to FIGS. 4-6, the steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1 or other drawings described herein. In certain embodiments, some or all steps of this process, and/or substantially equivalent steps, are performed by execution of processor-readable instructions stored or included on a processor-readable medium. For instance, in the description of FIGS. 4-6 that follows, the applications 120 run by the application server(s) 115 and the database system 130 can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIGS. 4-6, a particular example is described in which the applications 120 run by the application server(s) 115 and the database system 130 perform certain actions by interacting with other elements of the system 100.

FIG. 4 is a method 400 for assigning a record into a chunk of a partition within hardware-based network storage 170 of a non-relational database system 130 in accordance with the disclosed embodiments. The method 300 begins at 305 where an application executes at a hardware-based processing system of an application server to generate a particular record (R) having a corresponding record key. At 310, when the particular record (R) is ready to be inserted into a partition, the application accesses the non-relational database system 130 via a query interface and application programming interface 140 for the application 120. The method 400 then proceeds to 320. At 320, the mapping function of the application determines/computes, based on the record, a natural chunk key (K), the chunk assignment module 220 of the application assigns the particular record (R) to a particular candidate chunk that is a closest chunk available for insertion of the particular record (R) at a particular time that satisfies an assignment formula, and the particular record (R) can then be inserted into the particular candidate chunk having the particular chunk key. For example, in one embodiment, the particular candidate chunk (C) that is a closest chunk available for insertion of the particular record (R) at a particular time that satisfies an assignment formula, chunk_key(k)≤f (record key)<chunk_key(k+1). The assignment formula, chunk_key(k) ≤f (record key)<chunk_key(k+1), means that that the natural chunk key is greater than or equal to the chunk key of a chunk at index k and less than a chunk key of the chunk at index k+1, where f is the mapping function that maps the record key to the particular chunk key, and where k and k+1 are indices of two consecutive chunks that are available at the time of insertion. So the particular record has a corresponding record key having a value, and a chunk key that maps the value of the record key to a corresponding chunk such that the assignment formula: chunk_key(k)≤f (record key)<chunk_key(k+1), is satisfied, where k and k+1 are indices of two consecutive chunks and chunk keys are in sorted order. At this point, the particular record (R) will include the record key of the particular record that is mapped to the particular chunk key associated with the particular record.

After insertion of the record, the method proceeds to 330, where it is determined whether the number of records in the particular candidate chunk (that the record was inserted into) exceeds a particular threshold number (e.g., that is used to determine what is an acceptable size of a chunk). The threshold number is a configurable parameter that can vary depending on the implementation. For example, the number of records in the particular candidate chunk can be evaluated to determine whether the number of records is greater than the particular threshold number. For instance, in one implementation, the application 120 can determine the size of the particular candidate chunk using the following code: SELECT COUNT (*) FROM test WHERE partition=pk AND chunk=ID_of_chunk(k). If the size is greater than a pre-defined threshold (e.g., 30%), then the chunk will be split.

When the application 120 determines (at 330) that the number of records in the particular candidate chunk (that the record was inserted into) is less than or equal to the particular threshold number, the particular record (R) remains inserted into the particular candidate chunk (e.g., when record does not exceed a threshold size (e.g., is less than or equal to the threshold size), the record will remain assigned to the particular candidate chunk), and the method 300 loops back to 310.

When the application 120 determines (at 330) that the number of records in the particular candidate chunk is greater than the particular threshold number, the method 300 proceeds to 340, where the auto-balancing operation starts at the chunk splitting module 240 to split the particular candidate chunk such that records originally assigned to the particular candidate chunk are divided among the particular candidate chunk and a new chunk after the auto-balancing operation is complete. In other words, some of the number of records that were originally part of the particular candidate chunk are assigned to the new chunk, and other remaining ones that were originally part of the particular candidate chunk remain assigned to the particular candidate chunk.

After the chunk is split at 340 (e.g., the auto-balancing operation is complete), the method proceeds to 350 where splitting of the particular chunk is complete, and records that were originally part of the particular candidate chunk are assigned to the original, particular chunk (that was originally designated at 320) and the new chunk.

FIG. 5 is a method 340 for assigning a record to a chunk of a partition within a database and splitting the chunk if splitting is warranted in accordance with the disclosed embodiments.

The method 340 begins at 410 when the splitting process starts to split a given chunk (C) that includes the newly inserted record (R). The chunk (C) is the closest chunk available for insertion of the record (R) at the particular time. In one embodiment, the chunk (C) is the closest chunk available for insertion of the record (R) is determined by the relationship chunk_key(k)≤f (record key)<chunk_key(k+1).

Method 340 then proceeds to 420, where the mapping module 210 computes, via a mapping function based on the record key, the natural chunk key (K) using the record key of the particular record (R). The natural chunk key (K) corresponds to the newly inserted record (R) to be inserted, and is the value coming out of the mapping function, f (record key). The corresponding chunk key that $chunk_{key\ (k)}$=f (record key) may not exist at the time of insertion. The formula will take $chunk_{key\ (k)}$<f (record key).

Method 340 then proceeds to 430, where the application determines whether the natural chunk key (K) equals the chunk key (C) where the newly inserted record (R) was inserted. In other words, it is determined whether the natural chunk key (K) for the newly inserted record (R) is equal to the chunk key (C) where the newly inserted record (R) was first inserted.

When it is determined (at 430) that the natural chunk key (K) does not equal the chunk key (C) (e.g., K is greater than C) where the newly inserted record (R) was inserted, method 340 then proceeds to 440. At 440, the record (R) is the split point for a new chunk having a new chunk key (N) that is equal to the natural chunk key (K). In other words, the record (R) is assigned to a to-be created chunk having anew chunk key (N) that is equal to the natural chunk key (K) (i.e., the chunk has not been split yet). In other words, when the candidate chunk key (K) does not equal the chunk key (C) (e.g., K is greater than C), then there is no need to split the chunk and the record (R) is assigned to a new chunk that will have a new chunk key (N) that is equal to the natural chunk key (K) that was computed at 420.

When it is determined (at 430) that the natural chunk key (K) equals the chunk key (C), where the newly inserted record (R) was inserted, method 340 then proceeds to 450. When the natural chunk key (K) is equal to the chunk key (C), there is a need to split the chunk that the record is assigned to (i.e., split the chunk having the natural chunk key (K) that was computed at 420). At step 450, a search is performed to find another record within the candidate chunk (having the chunk key (K)) to serve as a split point, where the candidate chunk can be split into two chunks (that will be referred to as the original chunk (C) and new chunk (N)).

In one embodiment, at 450, a binary search is performed (by record key) within the particular candidate chunk to find a new record (P) to serve as the split point for splitting the particular candidate chunk into the particular candidate chunk and the new chunk. In one embodiment, that will be described below with reference to FIG. 6, at 450, a binary search by record key is performed within the chunk (that has the chunk key (C)) to find a record (P) that serves as the split point within the chunk. For example, in one implementation, the record keys can be evaluated to find a middle point (or split point) for the chunk (that has the chunk key (C)) where the chunk will be split into two chunks. Further details of one implementation of this embodiment will be described below with reference to FIG. 6.

FIG. 6 is a method 450 for determining a split point for splitting a chunk of a partition within a database in accordance with one non-limiting implementation of the disclosed embodiments. To do so, in one non-limiting embodiment, steps 454 and 456 collectively are used to conduct a binary search by record key within the particular candidate chunk (having chunk key (K)) for the middle of the chunk. It should be appreciated; however, that other methodologies could be used to determine the split point for splitting the particular candidate chunk.

The method 450 begins at 454, where application 120 retrieves all records in the particular candidate chunk having the natural chunk key (K), and then sorts all the records by record key. At 456, the application 120 can determine records in the particular candidate chunk where the particular candidate chunk is to be split into a first half and a second half. For example, in one non-limiting embodiment, the "middle" two records in the particular candidate check are found/determined so that this chunk can be split into a first half and a second half. For instance, when the size (nk) of the chunk is even, the middle two records where the particular candidate chunk is to be split are a first record n and a second record n+1, whereas in the case where the size (2n+1) of the chunk is odd, the records where the particular candidate chunk is to be split can be a middle record n and a record n+1 before the middle record:

Referring again to FIG. 5, at 460, the mapping function of the mapping module 210 can compute a new chunk key (N), based on the record key for record (P), that satisfies the assignment formula. In one embodiment, the mapping function 210 can determine new chunk key (N) such that the new chunk key (N) satisfies the following conditions: new_chunk_key>f (record key of record n); and new_chunk_key≤f (recond key of record n+1). The method then loops back to 430, where the application determines whether the natural chunk key (K) equals the particular chunk key (C).

When the application determines that the natural chunk key (K) does not equal the particular chunk key (C) (i.e., the natural chunk key (K) is greater than the particular chunk key (C)), the particular record (R) is the split point for a new chunk to-be created having a new chunk key (N) that is equal to the natural chunk key (K). The method then proceeds to 470. At 470, the particular candidate chunk (C) is split into two chunks the particular candidate chunk (C) and new chunk (N), and the record is assigned to new chunk (N). In one embodiment, all records in 2nd half of the chunk (C) from index k+1 to last element are updated. The new chunk follows the algorithm invariant: chunk_key(k)≤f (record key)<chunk_key(k+1), where k and k+1 are indices of two consecutive chunks and chunk keys are in sorted order.

Since all records to be modified are from chunk k, for any record key it already satisfies the relationship f(record_key)<chunk_key(k+1). Since the new chunk key is created such that new_chunk_key<=f(record key of record n+1), the relationship chunk_key(k)<=f(record_key) is satisfied as well.

The chunk split is then complete and the method 340 then ends at 350. It should be noted that for some storage solutions, an additional step for modifying records to split a chunk with the new chunk may involve deleting all affected records and re-create them with the new chunk key.

After the chunk is split (at 350), a quick in-memory computation can decide the designated chunk key for the newly-inserted record. If the new chunk key equals or is less than the record key, the to-be-created record belongs to the new chunk. Otherwise the to-be-created record will belong to the old chunk.

In addition, it should also be noted that because a chunk can be split in any time, for all operations that involve a database write (e.g., a create, update, delete, or auto-balance), an external lock should be used to prevent a race condition.

To help illustrate an example of the chunk splitting process, one non-limiting example will be described with reference to FIG. 7. FIG. 7 is a diagram of records in a partition before (at 710) and after (at 720) applying an auto-balancing process in accordance with the disclosed embodiments. In the example illustrated in FIG. 7, a partition is illustrated before applying an auto-balancing process (at 710), and then after applying the auto-balancing process (at 720). Before applying the auto-balancing process (at 710), the chunk with chunk key 3000 includes 13 records (i.e., records with record keys a02, a11, a12, b01, b33, b54, c02, c19, c61, c72, d05, d34, d77) that share a chunk key 3000. After applying the auto-balancing process (at 720), the original chunk with chunk key 3000 is split into two chunks: the chunk with chunk key 3000 includes six records (i.e., records with record keys a02, a11, a12, b01, b33, b54) that share a chunk key 3000, and the chunk with chunk key 3110 includes seven records (i.e., records with record keys c02, c19, c61, c72, d05, d34, d77) that share a chunk key 3110.

Figure 8:
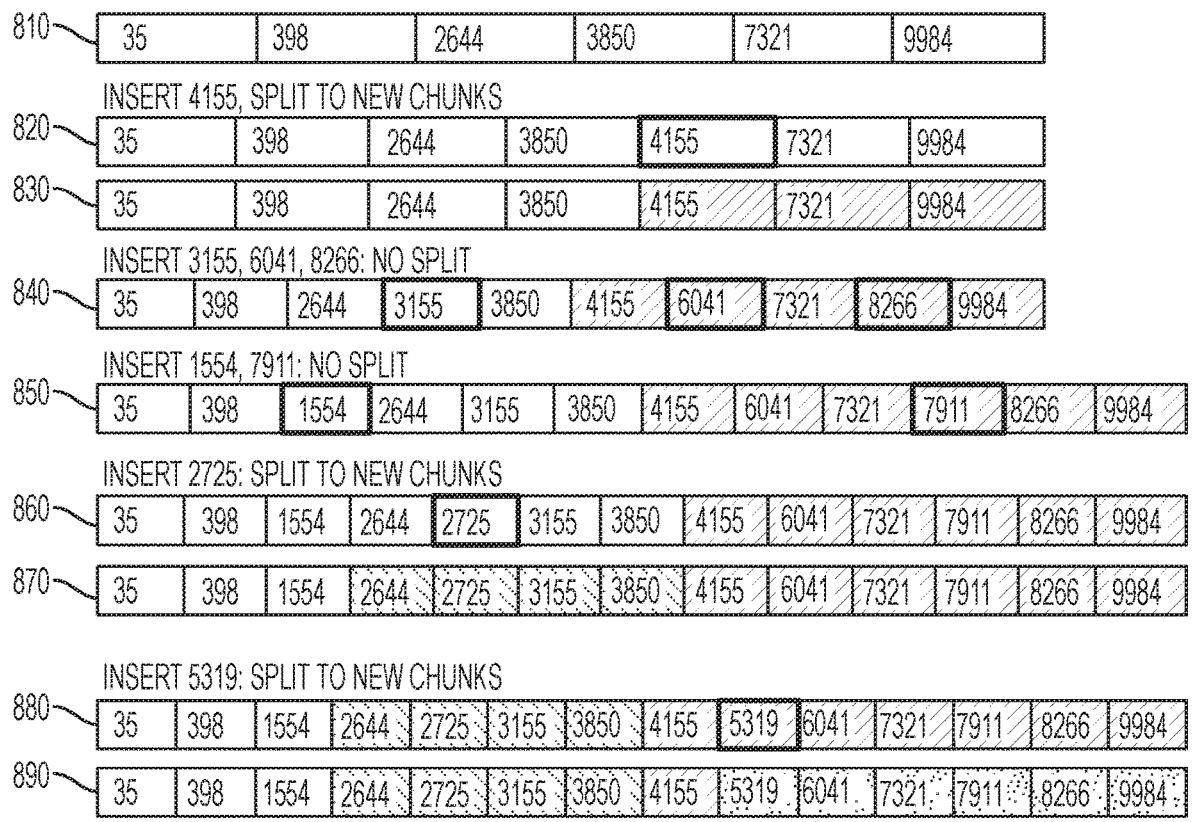
FIG. 8 is a diagram that illustrates a series of records being inserted into a partition before and after applying an auto-balancing process to split chunks in accordance with the disclosed embodiments.

To help illustrate another series of examples of chunk splitting, a non-limiting example will be described with reference to FIG. 8. FIG. 8 is a diagram that illustrates a series of records (having record keys ordered by numbers) being inserted into a partition before and after an auto-balancing process is applied to split chunks in accordance with the disclosed embodiments. In the example illustrated in FIG. 8, at 810, a partition is illustrated before record insertion and applying an auto-balancing process. As records are inserted, the auto-balancing process can be applied to split the chunks. Before applying the auto-balancing process (at 810), the chunk includes six records (35, 398, 2644, 3850, 7321, 9984) that are all part of one chunk. When a new record 4155 is inserted at 820, the auto-balancing process is applied, and the partition is split into two chunks (at 830). One chunk includes four records (35, 398, 2644, 3850) and the other new chunk includes three records (4155, 7321, 9984). At 840, when new records 3155, 6041, 8266 are inserted, there is no need to split the two chunks of the partition. One chunk includes five records (35, 398, 2644, 3155, 3850) and the other chunk includes five records (4155, 6041, 7321, 8266, 9984). At 850, when new records 1544, 7911 are inserted, there is still no need to split the two chunks of the partition. One chunk includes six records (35, 398, 1544, 2644, 3155, 3850) and the other chunk includes six records (4155, 6041, 7321, 7911, 8266, 9984). When a new record 2725 is inserted at 860, the auto-balancing process is applied, and the partition is split into three chunks (at 870). One chunk includes three records (35, 398, 1544), another chunk includes four records (2644, 2725, 3155, 3850), and the other chunk includes six records (4155, 6041, 7321, 7911, 8266, 9984). When a new record 5319 is inserted at 880, the auto-balancing process is applied, and the partition is split into four chunks (at 890). One chunk includes three records (35, 398, 1544), another chunk includes four records (2644, 2725, 3155, 3850), another chunk include one record (4155), and the other chunk includes six records (5319, 6041, 7321, 7911, 8266, 9984).

Figure 9:
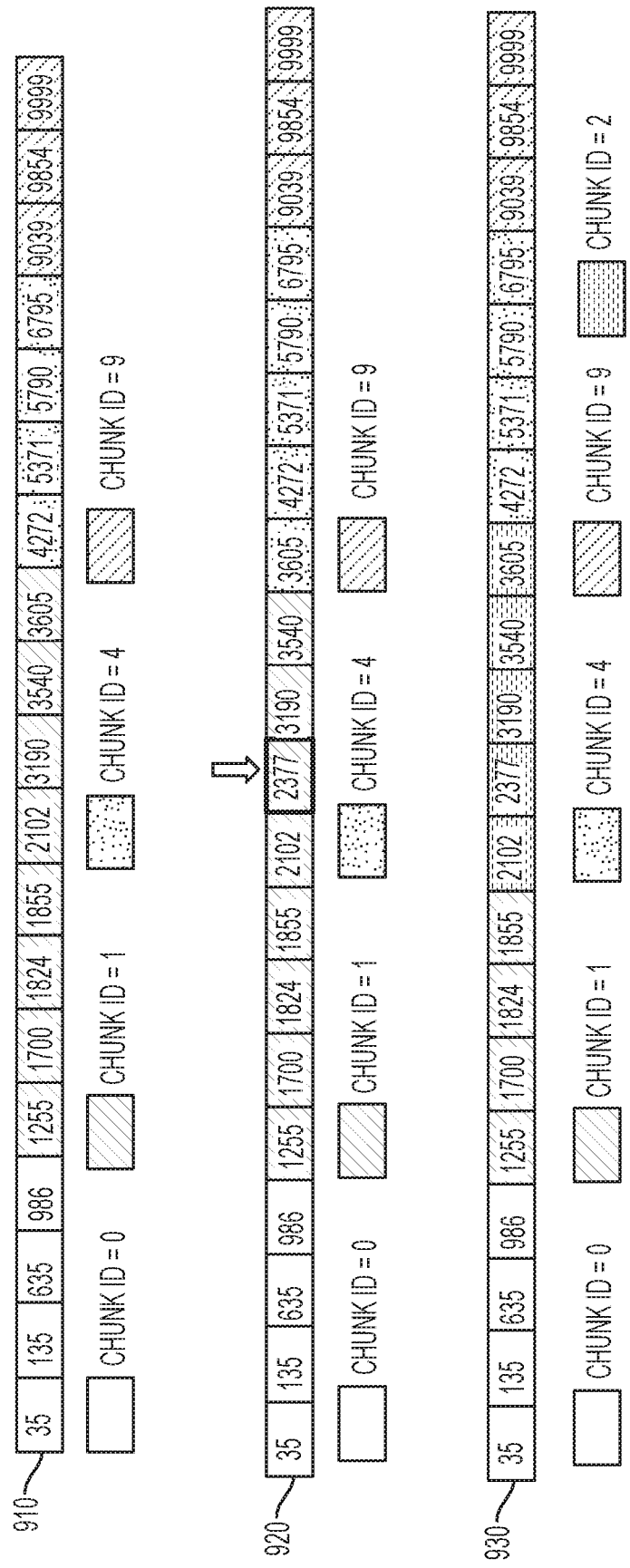
FIG. 9 is a diagram that illustrates a series of records being inserted into a partition before and after an auto-balancing process is applied to split chunks in accordance with the disclosed embodiments.

To help illustrate another series of examples of chunk splitting, another non-limiting example will be described with reference to FIG. 9. FIG. 9 is a diagram that illustrates a series of records (having record keys ordered by numbers) being inserted into a partition before and after an auto-balancing process is applied to split chunks in accordance with the disclosed embodiments. In the example illustrated in FIG. 9, at 910, a partition is illustrated before record insertion and applying an auto-balancing process. As records are inserted, the auto-balancing process can be applied to split the chunks. Before applying the auto-balancing process (at 910), partition includes four chunks: the first chunk, which has a chunk ID=0, includes four records (35, 135, 635, 986), the second chunk, which has a chunk ID=1, includes eight records (1255, 1700, 1824, 1855, 2102, 3190, 3540, 3605), the third chunk, which has a chunk ID=4, includes four records (4272, 5371, 5790, 6795), and the fourth chunk, which has a chunk ID=9, includes three records (9039, 9854, 9999). When a new record 2377 is inserted into the second chunk at 920, the auto-balancing process is applied and the second chunk is split into two chunks (at 830) such that the partition now has a total of five chunks: the first chunk, which has a chunk ID=0, includes four records (35, 135, 635, 986), the second chunk, which has a chunk ID=1, includes four records (1255, 1700, 1824, 1855), the third chunk, which has a chunk ID=2, includes five records (2102, 2377, 3190, 3540, 3605), the fourth chunk, which has a chunk ID=4, includes four records (4272, 5371, 5790, 6795), and the fifth chunk, which has a chunk ID=9, includes three records (9039, 9854, 9999).

Figure 10:
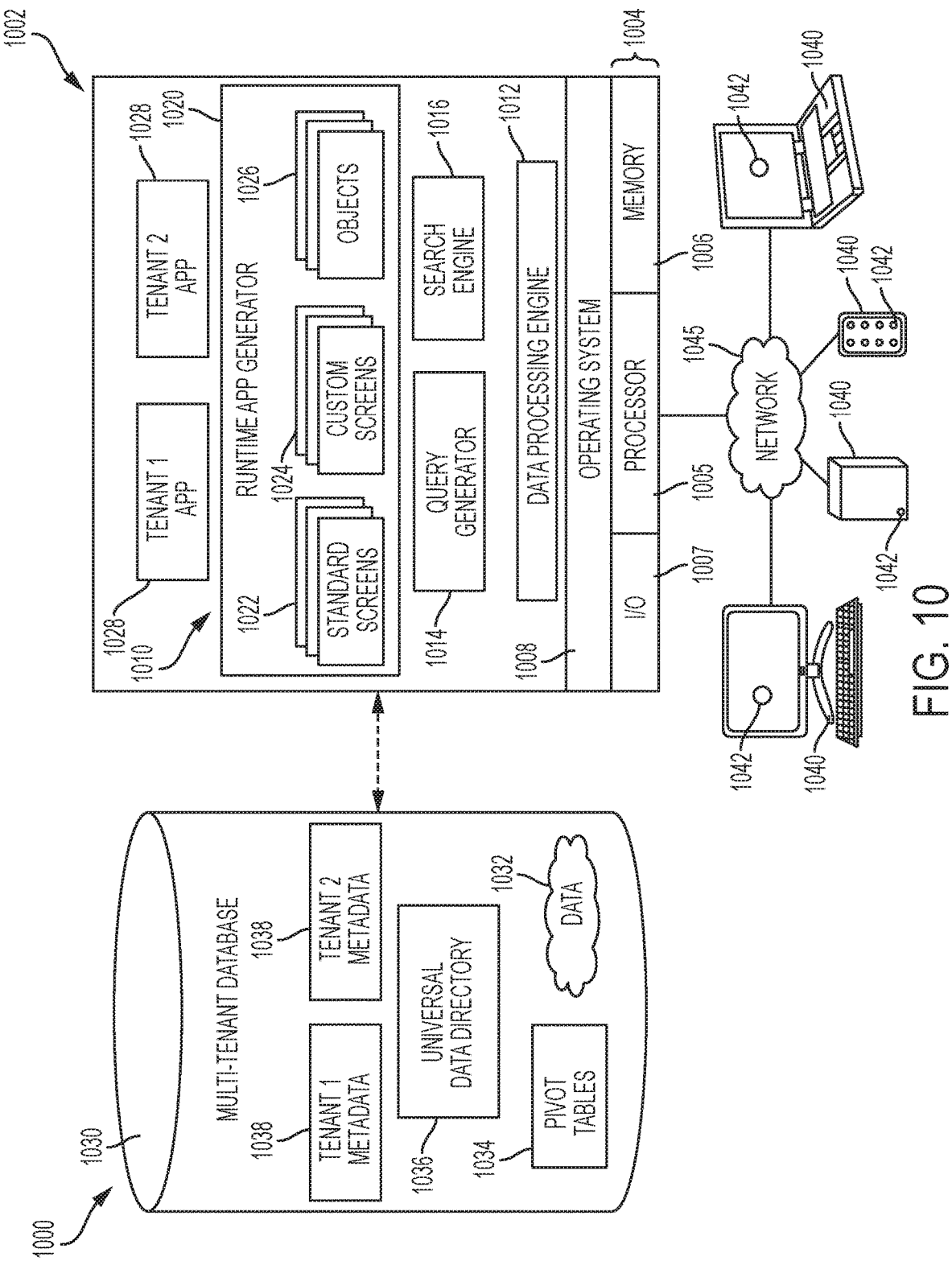
FIG. 10 is a schematic block diagram of an example of a multi-tenant computing environment in which features of the disclosed embodiments can be implemented in accordance with some of the disclosed embodiments.

FIG. 10 is a schematic block diagram of an example of a multi-tenant computing environment in which features of the disclosed embodiments can be implemented in accordance with the disclosed embodiments. As shown in FIG. 10, an exemplary cloud-based solution may be implemented in the context of a multi-tenant system 1000 including a server 1002 (or server system 1002) that supports applications 1028 based upon data 1032 from a database 1030 that may be shared between multiple tenants, organizations, or enterprises, referred to herein as a multi-tenant database. The multi-tenant system 1000 can be shared by many different organizations, and handles the storage of, and access to, different metadata, objects, data and applications across disparate organizations. In one embodiment, the multi-tenant system 1000 can be part of a database system, such as a multi-tenant database system.

The multi-tenant system 1000 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 1000 allows users of user systems 1040 to establish a communicative connection to the multi-tenant system 1000 over a network 1045 such as the Internet or any type of network described herein. Based on a user's interaction with a user system 1040, the application platform 1010 accesses an organization's data (e.g., records held by an object) and metadata that is stored at one or more database systems 1030 and provides the user system 1040 with access to applications based on that data and metadata. These applications are executed or run in a process space of the application platform 1010 will be described in greater detail below. The user system 1040 and various other user systems (not illustrated) can interact with the applications provided by the multi-tenant system 1000. The multi-tenant system 1000 is configured to handle requests for any user associated with any organization that is a tenant of the system. Data and services generated by the various applications 1028 are provided via a network 1045 to any number of user systems 1040, such as desktops, laptops, tablets, smartphones or other client devices, Google Glass™, and any other computing device implemented in an automobile, aircraft, television, or other business or consumer electronic device or system, including web clients.

Each application 1028 is suitably generated at run-time (or on-demand) using a common application platform 1010 that securely provides access to the data 1032 in the database 1030 for each of the various tenant organizations subscribing to the system 1000. The application platform 1010 has access to one or more database systems 1030 that store information (e.g., data and metadata) for a number of different organizations including user information, organization information, custom information, etc. The database systems 1030 can include a multi-tenant database system 1030 as described with reference to FIG. 10, as well as other databases or sources of information that are external to the multi-tenant database system 1030 of FIG. 10. In accordance with one non-limiting example, the service cloud 1000 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 1030. In this regard, each tenant includes one or more users and/or groups associated with, authorized by, or otherwise belonging to that respective tenant. Stated another way, each respective user within the multi-tenant system 1000 is associated with, assigned to, or otherwise belongs to a particular one of the plurality of enterprises supported by the system 1000.

Each enterprise tenant may represent a company, corporate department, business or legal organization, and/or any other entities that maintain data for particular sets of users (such as their respective employees or customers) within the multi-tenant system 1000. Although multiple tenants may share access to the server 1002 and the database 1030, the particular data and services provided from the server 1002 to each tenant can be securely isolated from those provided to other tenants. The multi-tenant architecture therefore allows different sets of users to share functionality and hardware resources without necessarily sharing any of the data 1032 belonging to or otherwise associated with other organizations.

The multi-tenant database 1030 may be a repository or other data storage system capable of storing and managing the data 1032 associated with any number of tenant organizations. The database 1030 may be implemented using conventional database server hardware. In various embodiments, the database 1030 shares processing hardware 1004 with the server 1002. In other embodiments, the database 1030 is implemented using separate physical and/or virtual database server hardware that communicates with the server 1002 to perform the various functions described herein.

In an exemplary embodiment, the database 1030 includes a database management system or other equivalent software capable of determining an optimal query plan for retrieving and providing a particular subset of the data 1032 to an instance of application (or virtual application) 1028 in response to a query initiated or otherwise provided by an application 1028, as described in greater detail below. The multi-tenant database 1030 may alternatively be referred to herein as an on-demand database, in that the database 1030 provides (or is available to provide) data at run-time to on-demand virtual applications 1028 generated by the application platform 1010, as described in greater detail below.

In practice, the data 1032 may be organized and formatted in any manner to support the application platform 1010. In various embodiments, the data 1032 is suitably organized into a relatively small number of large data tables to maintain a semi-amorphous "heap"-type format. The data 1032 can then be organized as needed for a particular virtual application 1028. In various embodiments, conventional data relationships are established using any number of pivot tables 1034 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1036, for example, can be used to describe any number of forms, reports, workflows, user access privileges, business logic and other constructs that are common to multiple tenants.

Tenant-specific formatting, functions and other constructs may be maintained as tenant-specific metadata 1038 for each tenant, as desired. Rather than forcing the data 1032 into an inflexible global structure that is common to all tenants and applications, the database 1030 is organized to be relatively amorphous, with the pivot tables 1034 and the metadata 1038 providing additional structure on an as-needed basis. To that end, the application platform 1010 suitably uses the pivot tables 1034 and/or the metadata 1038 to generate "virtual" components of the virtual applications 1028 to logically obtain, process, and present the relatively amorphous data 1032 from the database 1030.

The server 1002 may be implemented using one or more actual and/or virtual computing systems that collectively provide the dynamic application platform 1010 for generating the virtual applications 1028. For example, the server 1002 may be implemented using a cluster of actual and/or virtual servers operating in conjunction with each other, typically in association with conventional network communications, cluster management, load balancing and other features as appropriate. The server 1002 operates with any sort of conventional processing hardware 1004, such as a processor 1005, memory 1006, input/output features 1007 and the like. The input/output features 1007 generally represent the interface(s) to networks (e.g., to the network 1045, or any other local area, wide area or other network), mass storage, display devices, data entry devices and/or the like.

The processor 1005 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1006 represents any non-transitory short or long-term storage or other computer-readable media capable of storing programming instructions for execution on the processor 1005, including any sort of random access memory (RAM), read only memory (ROM), flash memory, magnetic or optical mass storage, and/or the like. The computer-executable programming instructions, when read and executed by the server 1002 and/or processor 1005, cause the server 1002 and/or processor 1005 to create, generate, or otherwise facilitate the application platform 1010 and/or virtual applications 1028 and perform one or more additional tasks, operations, functions, and/or processes described herein. It should be noted that the memory 1006 represents one suitable implementation of such computer-readable media, and alternatively or additionally, the server 1002 could receive and cooperate with external computer-readable media that is realized as a portable or mobile component or platform, e.g., a portable hard drive, a USB flash drive, an optical disc, or the like.

The server 1002, application platform 1010 and database systems 1030 can be part of one backend system. Although not illustrated, the multi-tenant system 1000 can include other backend systems that can include one or more servers that work in conjunction with one or more databases and/or data processing components, and the application platform 1010 can access the other backend systems.

The multi-tenant system 1000 includes one or more user systems 1040 that can access various applications provided by the application platform 1010. The application platform 1010 is a cloud-based user interface. The application platform 1010 can be any sort of software application or other data processing engine that generates the virtual applications 1028 that provide data and/or services to the user systems 1040. In a typical embodiment, the application platform 1010 gains access to processing resources, communications interfaces and other features of the processing hardware 1004 using any sort of conventional or proprietary operating system 1008. The virtual applications 1028 are typically generated at run-time in response to input received from the user systems 1040. For the illustrated embodiment, the application platform 1010 includes a bulk data processing engine 1012, a query generator 1014, a search engine 1016 that provides text indexing and other search functionality, and a runtime application generator 1020. Each of these features may be implemented as a separate process or other module, and many equivalent embodiments could include different and/or additional features, components or other modules as desired.

The runtime application generator 1020 dynamically builds and executes the virtual applications 1028 in response to specific requests received from the user systems 1040. The virtual applications 1028 are typically constructed in accordance with the tenant-specific metadata 1038, which describes the particular tables, reports, interfaces and/or other features of the particular application 1028. In various embodiments, each virtual application 1028 generates dynamic web content that can be served to a browser or other client program 1042 associated with its user system 1040, as appropriate.

The runtime application generator 1020 suitably interacts with the query generator 1014 to efficiently obtain multi-tenant data 1032 from the database 1030 as needed in response to input queries initiated or otherwise provided by users of the user systems 1040. In a typical embodiment, the query generator 1014 considers the identity of the user requesting a particular function (along with the user's associated tenant), and then builds and executes queries to the database 1030 using system-wide metadata 1036, tenant specific metadata 1038, pivot tables 1034, and/or any other available resources. The query generator 1014 in this example therefore maintains security of the common database 1030 by ensuring that queries are consistent with access privileges granted to the user and/or tenant that initiated the request.

With continued reference to FIG. 10, the data processing engine 1012 performs bulk processing operations on the data 1032 such as uploads or downloads, updates, online transaction processing, and/or the like. In many embodiments, less urgent bulk processing of the data 1032 can be scheduled to occur as processing resources become available, thereby giving priority to more urgent data processing by the query generator 1014, the search engine 1016, the virtual applications 1028, etc.

In exemplary embodiments, the application platform 1010 is utilized to create and/or generate data-driven virtual applications 1028 for the tenants that they support. Such virtual applications 1028 may make use of interface features such as custom (or tenant-specific) screens 1024, standard (or universal) screens 1022 or the like. Any number of custom and/or standard objects 1026 may also be available for integration into tenant-developed virtual applications 1028. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 1032 associated with each virtual application 1028 is provided to the database 1030, as appropriate, and stored until it is requested or is otherwise needed, along with the metadata 1038 that describes the particular features (e.g., reports, tables, functions, objects, fields, formulas, code, etc.) of that particular virtual application 1028. For example, a virtual application 1028 may include a number of objects 1026 accessible to a tenant, wherein for each object 1026 accessible to the tenant, information pertaining to its object type along with values for various fields associated with that respective object type are maintained as metadata 1038 in the database 1030. In this regard, the object type defines the structure (e.g., the formatting, functions and other constructs) of each respective object 1026 and the various fields associated therewith.

Still referring to FIG. 10, the data and services provided by the server 1002 can be retrieved using any sort of personal computer, mobile telephone, tablet or other network-enabled user system 1040 on the network 1045. In an exemplary embodiment, the user system 1040 includes a display device, such as a monitor, screen, or another conventional electronic display capable of graphically presenting data and/or information retrieved from the multi-tenant database 1030, as described in greater detail below.

Typically, the user operates a conventional browser application or other client program 1042 executed by the user system 1040 to contact the server 1002 via the network 1045 using a networking protocol, such as the hypertext transport protocol (HTTP) or the like. The user typically authenticates his or her identity to the server 1002 to obtain a session identifier ("SessionID") that identifies the user in subsequent communications with the server 1002. When the identified user requests access to a virtual application 1028, the runtime application generator 1020 suitably creates the application at run time based upon the metadata 1038, as appropriate. However, if a user chooses to manually upload an updated file (through either the web-based user interface or through an API), it will also be shared automatically with all of the users/devices that are designated for sharing.

As noted above, the virtual application 1028 may contain Java, ActiveX, or other content that can be presented using conventional client software running on the user system 1040; other embodiments may simply provide dynamic web or other content that can be presented and viewed by the user, as desired. As described in greater detail below, the query generator 1014 suitably obtains the requested subsets of data 1032 from the database 1030 as needed to populate the tables, reports or other features of the particular virtual application 1028.

The server system 1002 communicates with user systems 1040. The server system 1002 includes an application, or application platform that serves applications 1028 to user systems.

Although FIG. 10 illustrates the application being implemented using a cloud-based application or cloud-based application platform, it can also be implemented using any web application, or any client-server application. The application can access data (e.g., records) from an address space of a process. In general, the application can be hosted at the same system as the server system or at a different system than the server system. Depending on the implementation, data can be stored at storage that can be, for example, remote storage (e.g., cloud-based storage) or local storage (e.g., a database of a server system). In some implementations, the insights application can be implemented using cloud-based application platforms, such as, the Salesforce mobile application, Lightning applications (SFX), or any variants thereof. For example, in one embodiment, the application 1028 can be a mobile application served by an application platform, such as Salesforce mobile application and used by mobile devices running the Salesforce mobile app.

Objects and Records

In one embodiment, the multi-tenant database system 1030 can store data in the form of records and customizations. As used herein, the term "record" can refer to a particular occurrence or instance of a data object that is created by a user or administrator of a database service and stored in a database system, for example, about a particular (actual or potential) business relationship or project. The data object can have a data structure defined by the database service (a standard object) or defined by a subscriber (custom object).

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g. fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is working on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a pricebook, a product, a solution, a report, a forecast, a user, etc. For instance, an opportunity can correspond to a sales prospect, marketing project, or other business-related activity with respect to which a user desires to collaborate with others.

External objects are objects that an organization creates that map to data stored outside the organization. External objects are like custom objects, but external object record data is stored outside the organization. For example, data that's stored on premises in an enterprise resource planning (ERP) system can be accessed as external objects in real time via web service callouts, instead of copying the data into the organization.

Figure 11:
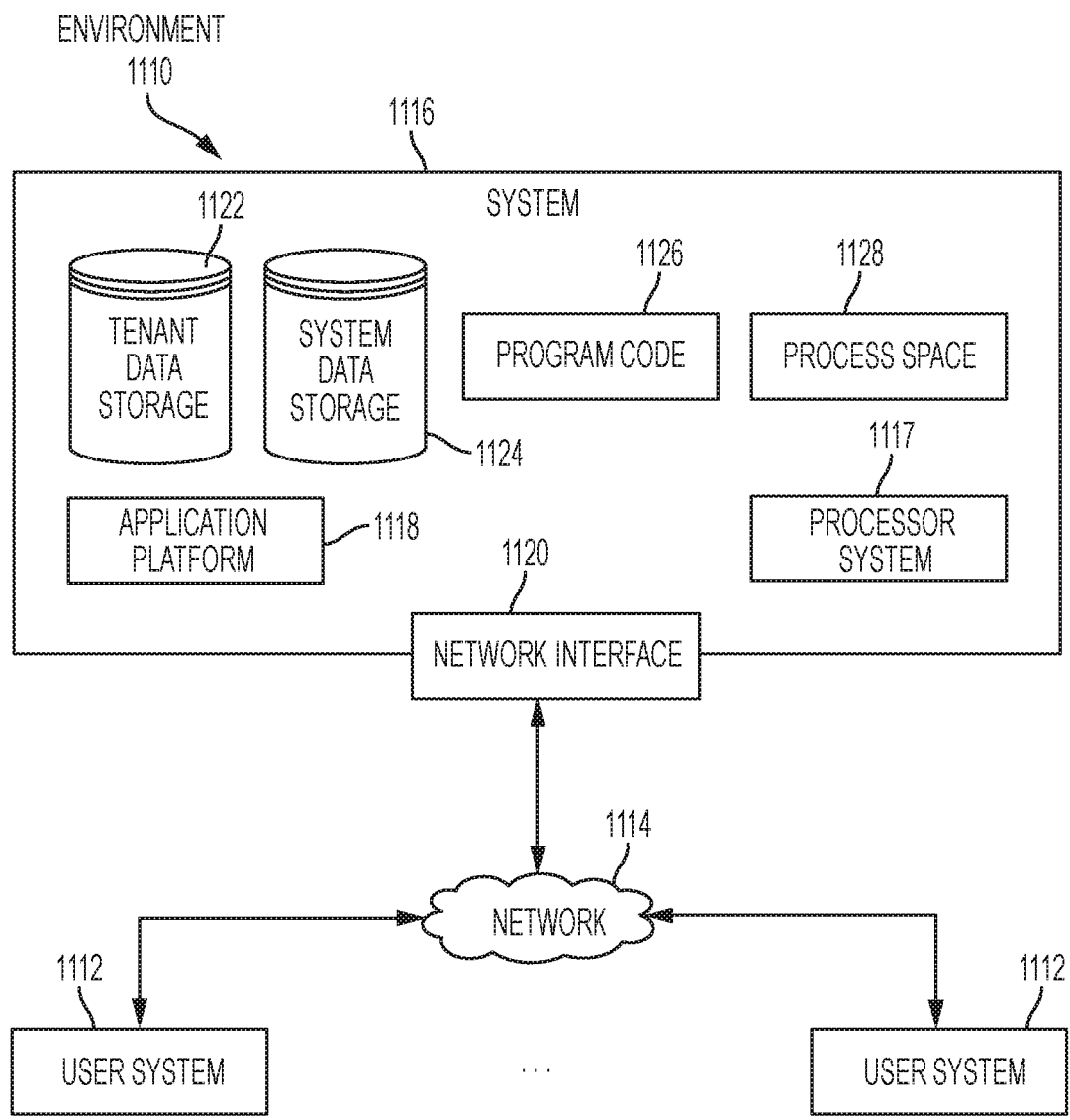
FIG. 11 is a block diagram that illustrates an example of an environment in which an on-demand database service can be used in accordance with some implementations.

FIG. 11 shows a block diagram of an example of an environment 1110 in which an on-demand database service can be used in accordance with some implementations. The environment 1110 includes user systems 1112, a network 1114, a database system 1116 (also referred to herein as a "cloud-based system"), a processor system 1117, an application platform 1118, a network interface 1120, tenant database 1122 for storing tenant data 1123, system database 1124 for storing system data 1125, program code 1126 for implementing various functions of the system 1116, and process space 1128 for executing database system processes and tenant-specific processes, such as running applications as part of an application hosting service. In some other implementations, environment 1110 may not have all of these components or systems, or may have other components or systems instead of, or in addition to, those listed above.

In some implementations, the environment 1110 is an environment in which an on-demand database service exists. An on-demand database service, such as that which can be implemented using the system 1116, is a service that is made available to users outside of the enterprise(s) that own, maintain or provide access to the system 1116. As described above, such users generally do not need to be concerned with building or maintaining the system 1116. Instead, resources provided by the system 1116 may be available for such users' use when the users need services provided by the system 1116; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 1118 can be a framework that allows the applications of system 1116 to execute, such as the hardware or software infrastructure of the system 1116. In some implementations, the application platform 1118 enables the creation, management and execution of one or more applications developed by the provider of the on-demand database service, users accessing the on-demand database service via user systems 1112, or third-party application developers accessing the on-demand database service via user systems 1112.

In some implementations, the system 1116 implements a web-based customer relationship management (CRM) system. For example, in some such implementations, the system 1116 includes application servers configured to implement and execute CRM software applications as well as provide related data, code, forms, renderable web pages and documents and other information to and from user systems 1112 and to store to, and retrieve from, a database system related data, objects, and Web page content. In some MTS implementations, data for multiple tenants may be stored in the same physical database object in tenant database 1122. In some such implementations, tenant data is arranged in the storage medium(s) of tenant database 1122 so that data of one tenant is kept logically separate from that of other tenants so that one tenant does not have access to another tenant's data, unless such data is expressly shared. The system 1116 also implements applications other than, or in addition to, a CRM application. For example, the system 1116 can provide tenant access to multiple hosted (standard and custom) applications, including a CRM application. User (or third-party developer) applications, which may or may not include CRM, may be supported by the application platform 1118. The application platform 1118 manages the creation and storage of the applications into one or more database objects and the execution of the applications in one or more virtual machines in the process space of the system 1116.

According to some implementations, each system 1116 is configured to provide web pages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 1114 can be or include any network or combination of networks of systems or devices that communicate with one another. For example, the network 1114 can be or include any one or any combination of a LAN (local area network), WAN (wide area network), telephone network, wireless network, cellular network, point-to-point network, star network, token ring network, hub network, or other appropriate configuration. The network 1114 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 1112 can communicate with system 1116 using TCP/IP and, at a higher network level, other common Internet protocols to communicate, such as HTTP, FTP, AFS, WAP, etc. In an example where HTTP is used, each user system 1112 can include an HTTP client commonly referred to as a "web browser" or simply a "browser" for sending and receiving HTTP signals to and from an HTTP server of the system 1116. Such an HTTP server can be implemented as the sole network interface 1120 between the system 1116 and the network 1114, but other techniques can be used in addition to or instead of these techniques. In some implementations, the network interface 1120 between the system 1116 and the network 1114 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 1112 can be implemented as any computing device(s) or other data processing apparatus or systems usable by users to access the database system 1116. For example, any of user systems 1112 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 1112 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 1116) of the user system 1112 to access, process and view information, pages and applications available to it from the system 1116 over the network 1114.

Each user system 1112 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 1112 in conjunction with pages, forms, applications and other information provided by the system 1116 or other systems or servers. For example, the user interface device can be used to access data and applications hosted by system 1116, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 1112 may differ in their respective capacities, and the capacity of a particular user system 1112 can be entirely determined by permissions (permission levels) for the current user of such user system. For example, where a salesperson is using a particular user system 1112 to interact with the system 1116, that user system can have the capacities allotted to the salesperson. However, while an administrator is using that user system 1112 to interact with the system 1116, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 1112 and some or all of its components are operator-configurable using applications, such as a browser, including computer code executed using a central processing unit (CPU) such as an Intel Pentium® processor or the like. Similarly, the system 1116 (and additional instances of an MTS, where more than one is present) and all of its components can be operator-configurable using application(s) including computer code to run using the processor system 1117, which may be implemented to include a CPU, which may include an Intel Pentium® processor or the like, or multiple CPUs.

The system 1116 includes tangible computer-readable media having non-transitory instructions stored thereon/in that are executable by or used to program a server or other computing system (or collection of such servers or computing systems) to perform some of the implementation of processes described herein. For example, computer program code 1126 can implement instructions for operating and configuring the system 1116 to intercommunicate and to process web pages, applications and other data and media content as described herein. In some implementations, the computer code 1126 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for performing an auto-balancing operation in a partition of hardware-based network storage of a non-relational database system that comprises a plurality of partitions the method comprising:

assigning a plurality of records having a common attribute for grouping and stored to a same partition of the plurality of partitions to a plurality of chunks within the same partition without affecting a location of records in the hardware-based network storage, wherein each chunk of the plurality of chunks comprises a respective unique group of records of the plurality of records and a unique chunk identifier that identifies that chunk within that same partition, wherein assigning the plurality of records comprises, for a particular record of the plurality of records:

mapping a respective record key uniquely identifying the particular record to a natural chunk identifier, wherein the respective record key comprises data from one or more fields of the particular record and the natural chunk identifier comprises a numerical value corresponding to the data from the one or more fields of the particular record;

assigning the particular record to a particular candidate chunk of the same partition having a particular chunk identifier (chunk_identifier(k)) that is a closest chunk available for insertion of the particular record at a particular time that satisfies an assignment formula: chunk_identifier(k)≤f(record key)<chunk_identifier(k+1), where f(record key) corresponds to the natural chunk identifier determined by the mapping of the data from the one or more fields of the particular record, where k and k+1 are indices of two consecutive chunks and chunk identifiers of the plurality of chunks are in sorted order, wherein the particular candidate chunk of the same partition comprises the respective unique group of records sorted by their corresponding record keys;

determining a first chunk of the plurality of chunks should be split when a number of records in the first chunk of the same partition exceeds a particular threshold number when a new record is inserted into the partition and assigned to the first chunk according to the assignment formula; and after determining the first chunk should be split:

determining a new chunk identifier for splitting the first chunk based at least in part on the respective record key uniquely identifying the new record and the respective unique group of records sorted by their corresponding record keys assigned to the first chunk; and updating the respective chunk identifier associated with a first subset of the number of records that were originally part of the first chunk to the new chunk identifier to assign the first subset of the number of records to a new chunk without affecting the location of the records in the hardware-based network storage, wherein a second subset of the number of records originally assigned to the first chunk of the same partition remain assigned to the first chunk such that the number of records originally assigned to the first chunk are divided among the first chunk of the same partition and the new chunk of the same partition such that the assignment formula is satisfied after the updating is complete, wherein the respective unique group of records in each chunk are processible as a unit without iterating through all records of the same partition.

2. The method according to claim 1, wherein the natural chunk identifier is greater than or equal to a chunk identifier of a chunk at index k and less than a chunk identifier of another chunk at index k+1, and wherein a mapping function maps the record key to the particular chunk identifier, and wherein k and k+1 are indices of two consecutive chunks that are available at the time of insertion.

3. The method according to claim 1, wherein determining the new chunk identifier for splitting the first chunk comprises:

performing a binary search by record key within the first chunk of the same partition to find the new record to serve as the split point for splitting the first chunk of the same partition into the first chunk of the same partition and the new chunk of the same partition.

4. The method according to claim 3, wherein performing a binary search by record key within the first chunk of the same partition, comprises:

retrieving all records in the first chunk of the same partition having the natural chunk identifier;
sorting all the records by record key; and
determining records in the first chunk of the same partition where the first chunk of the same partition is to be split into a first half and a second half.

5. The method according to claim 4, wherein determining the records in the first chunk of the same partition comprises:

determining, when the size (nk) of the chunk is even, that a middle two records where the first chunk of the same partition is to be split into the first half and the second half are a first record n and a second record n+1.

6. The method according to claim 4, wherein determining the records in the first chunk of the same partition comprises:

determining, when the size (2n+1) of the chunk is odd, that the records where the first chunk of the same partition is to be split into the first half and the second half are a middle record n+1 and a record n+1 before the middle record.

7. The method according to claim 1, wherein the non-relational database system is capable of supporting chunking of the records in the same partition so that auto-balancing functionality can be implemented at a query level within an application and is transparent to the hardware-based network storage, wherein the same partition is a collection of records that have a common query attribute for grouping within that same partition.

8. The method according to claim 7, wherein the application is written to follow a particular database schema supported by a database management system (DBMS), wherein information needed to store a record in accordance with the particular database schema that the application is written to follow, comprises: (1) a partition key, (2) a chunk identifier, (3) a record key, and (4) data associated with the record.

9. The method of claim 1, wherein the respective record key comprises a string and the natural chunk identifier comprises a hash code the string is mapped to.

10. The method of claim 1, wherein the respective record key comprises a date-time and the natural chunk identifier comprises a time-stamp the date-time is mapped to.

11. The method of claim 1, wherein the data from the particular record includes at least one of a name, an ID, and a creation date-time.

12. The method of claim 1, wherein mapping the respective record key uniquely identifying the particular record to the natural chunk identifier comprises hashing the data from the particular record into an integer.

13. A non-transitory, computer-readable medium containing instructions thereon, which, when executed by a processor, are configurable to cause the process to perform operations comprising:

assigning a plurality of records having a common attribute for grouping and stored to a same partition of hardware-based network storage of a non-relational database system that comprises a plurality of partitions to a plurality of chunks without affecting a location of records in the hardware-based network storage, wherein the partition comprises the plurality of chunks each having a unique chunk identifier that identifies that chunk within that same partition and each chunk of the plurality of chunks comprises a respective unique group of records of the plurality of records, wherein assigning the plurality of records comprises, for a particular record of the plurality of records:

mapping a respective record key uniquely identifying the particular record to a natural chunk identifier, wherein the respective record key comprises data from one or more fields of the particular record and the natural chunk identifier comprises a numerical value corresponding to the data from the one or more fields of the particular record;

assigning the particular record to a particular candidate chunk of the same partition having a particular chunk identifier (chunkidentifier(k)) that is a closest chunk available for insertion of the particular record at a particular time that satisfies an assignment formula: chunk_identifier(k)≤f(record key)<chunk_identifier(k+1), where f(record key) corresponds to the natural chunk identifier determined by the mapping of the data from the one or more fields of the particular record, where k and k+1 are indices of two consecutive chunks and chunk identifiers of the plurality of chunks are in sorted order, wherein the particular candidate chunk of the same partition comprises the respective unique group of records sorted by their corresponding record keys;

determining a first chunk of the plurality of chunks should be split when a number of records in the first chunk of the same partition exceeds a particular threshold number when a new record is inserted into the partition and assigned to the first chunk according to the assignment formula; and after determining the first chunk should be split:
determining a new chunk identifier for splitting the first chunk based at least in part on the respective record key uniquely identifying the new record and the respective unique group of records sorted by their corresponding record keys assigned to the first chunk; and updating the respective chunk identifier associated with a first subset of the number of records that were originally part of the first chunk to the new chunk identifier to assign the first subset of the number of records to a new chunk without affecting the location of the records in the hardware-based network storage, wherein a second subset of the number of records originally assigned to the first chunk of the same partition remain assigned to the first chunk such that the number of records originally assigned to the first chunk are divided among the first chunk of the same partition and the new chunk of the same partition such that the assignment formula is satisfied after the updating is complete, wherein the respective unique group of records in each chunk are processable as a unit without iterating through all records of the same partition.

14. The computer-readable medium of claim 13, wherein the respective record key comprises a string and the natural chunk identifier comprises a hash code the string is mapped to.

15. The computer-readable medium of claim 13, wherein the respective record key comprises a date-time and the natural chunk identifier comprises a time-stamp the date-time is mapped to.

16. The computer-readable medium of claim 13, wherein:
mapping the respective record key uniquely identifying the particular record to the natural chunk identifier comprises hashing the data from the particular record into an integer.

17. A system, comprising:
a non-relational database system comprising:
hardware-based network storage that comprises a plurality of partitions, wherein each partition comprises one or more chunks each having a unique chunk identifier that identifies that chunk within a same partition; and
a database management system (DBMS) having a query interface and application programming interface for an application, and a database storage engine used to create, read, update and delete (CRUD) records at the hardware-based network storage; and
an application server, comprising:
a hardware-based processing system configured to execute the application as a server process to generate a plurality of records having a respective record key that is an identifier that uniquely identifies a particular record, wherein the plurality of records have a common attribute for grouping and are stored to the same partition of the plurality of partitions, wherein the particular record is to be inserted into the non-relational database system, when the particular record is ready to be inserted into the same partition, wherein the application is configured to: access the non-relational database system through the query interface and application programming interface for the application when the particular record is ready to be inserted into the partition; and
wherein the application is configured to:
assign the plurality of records to a plurality of chunks without affecting a location of records in the hardware-based network storage, wherein each chunk of the plurality of chunks comprises a respective unique group of records of the plurality of records and the unique chunk identifier that identifies that chunk within that same partition, wherein assigning the plurality of records comprises, for the particular record of the plurality of records:
mapping a respective record key uniquely identifying the particular record to a natural chunk identifier, wherein the respective record key comprises data from one or more fields of the particular record and the natural chunk identifier comprises a numerical value corresponding to the data from the one or more fields of the particular record;
assigning the particular record to a particular candidate chunk of the same partition having a particular chunk identifier (chunkidentifier(k)) that is a closest chunk available for insertion of the particular record at a particular time that satisfies an assignment formula: chunk_identifier(k)≤f(record key)<chunk_identifier(k+1), where f(record key) corresponds to the natural chunk identifier determined by the mapping of the data from the one or more fields of the particular record, where k and k+1 are indices of two consecutive chunks and chunk identifiers of the plurality of chunks are in sorted order, wherein the particular candidate chunk of the same partition comprises the respective unique group of records sorted by their corresponding record keys;
determine a first chunk of the plurality of chunks should be split when a number of records in the first chunk of the same partition exceeds a particular threshold number when a new record is inserted into the partition and assigned to the first chunk according to the assignment formula; and
after determining the first chunk should be split:
determining a new chunk identifier for splitting the first chunk based at least in part on the respective record key uniquely identifying the new record and the respective unique group of records sorted by their corresponding record keys assigned to the first chunk; and updating the respective chunk identifier associated with a first subset of the number of records that were originally part of the first chunk to the new chunk identifier to assign the first subset of the number of records to a new chunk without affecting the location of the records in the hardware-based network storage, wherein a second subset of the number of records originally assigned to the first chunk of the same partition remain assigned to the first chunk such that the number of records originally assigned to the first chunk are divided among the first chunk of the same partition and the new chunk of the same partition such that the assignment formula is satisfied after the updating is complete, wherein the respective unique group of records in each chunk are processible as a unit without iterating through all records of the same partition.

* * * * *